United States Patent
Hyodo et al.

(10) Patent No.: US 6,827,838 B2
(45) Date of Patent: Dec. 7, 2004

(54) METHOD OF SEPARATING AND COLLECTING $^{18}$F IN $^{18}$O WATER

(75) Inventors: Toshio Hyodo, Tokyo (JP); Yoshiko Itoh, Saitama (JP); Fuminori Saito, Tokyo (JP); Yasuyuki Nagashima, Tokyo (JP); Toshikazu Kurihara, Ibaraki (JP); Akira Goto, Saitama (JP); Masayuki Kase, Saitama (JP); Yasushige Yano, Saitama (JP); Katsumi Senoo, Saitama (JP)

(73) Assignee: Riken, Saitama (JP)

( * ) Notice: Subject to any disclaimer, the term of this patent is extended or adjusted under 35 U.S.C. 154(b) by 0 days.

(21) Appl. No.: 10/203,488

(22) PCT Filed: Feb. 9, 2001

(86) PCT No.: PCT/JP01/00925
§ 371 (c)(1),
(2), (4) Date: Aug. 9, 2002

(87) PCT Pub. No.: WO01/58572
PCT Pub. Date: Aug. 16, 2001

(65) Prior Publication Data
US 2003/0010619 A1 Jan. 16, 2003

(30) Foreign Application Priority Data

Feb. 9, 2000 (JP) .......................................... 2000-32292
Jun. 16, 2000 (JP) ....................................... 2000-181870

(51) Int. Cl.$^7$ ................................................. C25C 1/24
(52) U.S. Cl. ....................... 205/619; 205/628; 205/622; 205/630; 205/631; 205/632; 205/633; 205/635; 205/636; 205/637; 205/638; 205/639; 205/83
(58) Field of Search ............................... 205/619, 628, 205/622, 630, 631, 632, 633, 635, 636, 637, 638, 639, 83; 204/157.2

(56) References Cited

U.S. PATENT DOCUMENTS

| | | | |
|---|---|---|---|
| 4,400,250 A | 8/1983 | Fairhurst | |
| 5,425,858 A | 6/1995 | Farmer | |
| 5,454,924 A | 10/1995 | Jansen et al. | |
| 5,770,030 A | 6/1998 | Hamacher et al. | |

FOREIGN PATENT DOCUMENTS

| EP | 949 632 A2 | 10/1999 |
|---|---|---|
| JP | 2000-147195 | 5/2000 |

OTHER PUBLICATIONS

Alexoff et al., "Recovery of [18F]Fluoride from [18O]Water in an Electrochemical cell", Appl. Radiat. Isol., vol. 40, No. 1, pp. 1–6 1989. No month available.*

* cited by examiner

Primary Examiner—Wesley A. Nicolas
(74) Attorney, Agent, or Firm—Osha & May L.L.P.

(57) ABSTRACT

A method of separating and recovering $^{18}$F from $^{18}$O water at high purity and efficiency while maintaining the purity of the $^{18}$O water. By using a solid electrode (1) as an anode and a container (electrodeposition vessel) (2) made of platinum as a cathode, $^{18}$F in a solution (4) is electrodeposited on the solid electrode surface by applying a voltage. Then, by using the solid electrode (1) on which $^{18}$F is electrodeposited as a cathode and a container (recovery vessel) (5) holding pure water therein as an anode, $^{18}$F is recovered in the pure water by applying a voltage of opposite polarity to that of the electrodeposition. In this process, little $^{18}$O water is lost. The initial concentration of the $^{18}$O water is maintained even after the electrodeposition of $^{18}$F, so that the $^{18}$O water can be repeatedly used as an irradiation target for production of $^{18}$F.

9 Claims, 9 Drawing Sheets

METHOD OF SEPARATING AND COLLECTING $^{18}$F IN $^{18}$O WATER

TECHNICAL FIELD

The present invention relates to a method of efficiently separating and recovering $^{18}$F contained in $^{18}$O water.

BACKGROUND ART

The positron emitting nuclides used in positron emission tomography (PET) include $^{11}$C (half-life of 20 min), $^{13}$N (10 min), $^{15}$O (2 min), and $^{18}$F (110 min), and of these $^{11}$C and $^{18}$F are most widely used. They have a short average lifetime and can be manufactured, in principle, without carriers. To utilize these short-lifetime nuclides, an accelerator is set up near the relevant facility. Since, particularly, $^{18}$F has a relatively long-lifetime (half-life of 110 min), there are expectations for its application in research and medical facilities located away from the accelerator facility. The longer lifetime also allows to take time in synthesizing a labeled compound, and vigorous attempts are being made to synthesize a variety of labeled compounds. A labeled compound $^{18}$FDG is used not only as a tracer in measuring saccharometabolism in the brain but also as an imaging agent for cancer tumors. Metastasis of cancer cells, for example, can be detected with higher sensitivity by PET than by X-ray CT or MRT. $^{18}$F-DOPA is used for diagnosing Parkinson's disease.

$^{18}$F is produced through the $^{18}$O(p, n)$^{18}$F reaction by irradiating a liquid target $^{18}$O water with protons. Only a minute amount of $^{18}$O produces a nuclear reaction. $^{18}$O water is expensive, and since a few grams of it is required for a single irradiation, efficient recovery and reuse of $^{18}$O is strongly called for in order to reduce running costs. A conventional $^{18}$F recovery method is based on the use of an ion exchange resin. The method consists of a two-step operation, in which $^{18}$F is separated from $^{18}$O water by ion exchange, and then $^{18}$F is recovered from the ion exchange resin by using, e.g., carbon dioxide gas or potassium carbonate. The ion exchange resin must be carefully processed beforehand, and caution must be exercised so as to prevent the mixing of chlorine ions. While chemicals (carbon dioxide gas, potassium carbonate and the like) are used for recovery of $^{18}$F adsorbed on the ion exchange resin, these impurities are not desirable from the viewpoint of having greater possibilities for the synthesis of labeled compounds. There are also the problems regarding the control of flow rate of a $^{18}$F solvent for ion exchange and the clogging of the ion exchange resin column.

Alexoff et al have performed $^{18}$F-electrodeposition experiments in search of a method of recovering $^{18}$F alternative to the ion exchange resin method (Appl. Radiat. Isot. Vol. 40, No. 1, pp.1–6, 1989). They examined the time, voltage and electric field gradient dependence of the electrodeposition rate and recovery rate. The recovery rate of $^{18}$F was 70% (rate of electrodeposition on a vitreous carbon electrode surface was 95%, and the ratio of re-emission of $^{18}$F was 70%), which did not reach the recovery rate (95%) in the case of using an ion exchange resin. Further, when the voltage was increased, vitreous carbon powder dropped into the liquid solution. The authors conclude, therefore, that while the electrodeposition method can recover $^{18}$F that does not contain impurities, the ion exchange resin method is superior for the purpose of recovering greater-strength $^{18}$F required for PET.

A high recovery rate is required in recovering the $^{18}$F that is produced through the nuclear reaction $^{18}$O(p, n)$^{18}$F by irradiating a liquid target $^{18}$O water with protons accelerated by a cyclotron. $^{18}$F used for the synthesis of labeled compounds for medical or biological experiment purposes requires a particularly high purity. The half-life of $^{18}$F, though longer than that of, e.g., $^{11}$C (half-life 20 min), is only 110 min. Accordingly, the recovery of $^{18}$F and synthesis of labeled compounds using $^{18}$F must be finished in a short period of time. It is also important to recover the $^{18}$O water at high purity after the separation and recovery of $^{18}$F, so that the $^{18}$O water can be reused and the running cost of $^{18}$F manufacture for PET can be minimized.

The present invention takes advantage of the electrolysis method to avoid the problems of the ion exchange resin method, and has as its object the realization of highly efficient recovery of $^{18}$F and high-purity $^{18}$O water.

DISCLOSURE OF THE INVENTION

In accordance with the present invention, $^{18}$F in $^{18}$O water held in a container is electrodeposited on the surface of a solid electrode which is used as an anode. The electrodeposition liquid ($^{18}$O water) remaining after the electrodeposition of $^{18}$F is recycled for irradiation. By using, as a cathode, the solid electrode on which $^{18}$F has been electrodeposited and, as an anode, a container holding pure water or an electrode disposed in the container with the pure water, a voltage of opposite polarity to the case of electrodeposition is applied. As a result, the $^{18}$F electrodeposited on the solid electrode is desorbed into the pure water and recovered as an $^{18}$F solution. By using high-purity graphite or platinum as the solid electrode, mixing of impurities, which blocks the synthesis and use of labeled compounds, can be prevented in the recovery process.

Further, by controlling the value of voltage or current for the electrodeposition and desorption of $^{18}$F, the efficiency of electrodeposition and desorption are controlled. This method solves the problems of the electrodeposition methods according to the prior art, and enables a high-purity $^{18}$F to be recovered at high efficiency while maintaining the purity of the expensive $^{18}$O water.

Specifically, the method of separating and recovering $^{18}$F according to the present invention comprises the steps of: applying a voltage by using a solid electrode as an anode and, as a cathode, either an electrode disposed in a container holding $^{18}$O water containing $^{18}$F or the container itself, such that the $^{18}$F binds to the surface of the solid electrode; and applying a voltage by using the solid electrode to which the $^{18}$F has bound as a cathode and, as an anode, either an electrode disposed in a container holding pure water or the pure-water holding container itself, such that the $^{18}$F bound to the surface of the solid electrode is released into the pure water. The container for holding the $^{18}$O water containing $^{18}$F and the container for holding pure water may be one and the same or separate.

The solid electrode may use either carbon or platinum. For the recovery of a high-intensity $^{18}$F, it is preferable to use graphite as a carbon member, or platinum which is meshed or made porous to increase its surface area.

During the step of having the $^{18}$F bind to the solid electrode surface, the progress of electrodeposition of $^{18}$F to the solid electrode surface may be monitored on the basis of an electric current (electrodeposition current) flowing between the anode and the cathode. The electrodeposition current initially exhibits a large value but this gradually decreases, and becomes constant when most of the $^{18}$F in the solution has been electrodeposited on the surface of the solid electrode. Thus, the changes in the electrodeposition current can be measured so that the time at which the current becomes constant can be regarded as the time at which electrodeposition comes to an end.

Similarly, the step of releasing the $^{18}$F bound to the surface of the solid electrode into the pure water may comprise monitoring the degree of release of $^{18}$F into pure water on the basis of either the current (desorption current) flowing between the solid electrode (cathode) and the anode, or the voltage (desorption voltage) across the solid electrode (cathode) and the anode, or both. For example, the current flowing between the solid electrode and the anode increases as $^{18}$F is released into pure water, but the rate of increase slows down and the current approaches a constant value as the release of $^{18}$F approaches an end. Thus, the current flowing between the solid electrode and the anode can be monitored so that the step of releasing $^{18}$F can be stopped when the current reaches a constant value.

Thus, by monitoring the electrodeposition current, the desorption current, or the release voltage, the degree or progress of electrodeposition or desorption of $^{18}$F can be known, so that time loss can be eliminated.

By controlling the current or voltage, the rate of electrodeposition and desorption of $^{18}$F can be controlled. As a result, excessive generation of heat can be prevented so that, when a carbon electrode is used as the solid electrode, the peeling of the carbon electrode caused by heating can be prevented. Further, by controlling the size of the solid electrode, the efficiency of electrodeposition and desorption can be improved. It should be noted that, in the case where an electrolyte is used for the synthesis of $^{18}$F-labeled compounds, the time required for releasing may possibly be reduced by mixing the electrolyte into the desorbed liquid and thus increasing the electric conductivity.

In accordance with the present invention, since the $^{18}$F in the $^{18}$O water is removed by binding it to the surface of the solid electrode, the $^{18}$O water is not diluted nor are impurities mixed therein during the process of recovering $^{18}$F. Further, it was found that the electrodeposition current increases as the activity of $^{18}$F becomes greater. This means that in the case of electrodepositing a high-intensity $^{18}$F, there is no need to add Na$^{19}$F as an electric charge carrier for electrodeposition. Thus, since the method of the present invention does not involve the impurity Na$^{19}$F, a high-purity $^{18}$O water can be easily recovered.

Furthermore, in the case where a Havar foil is used for the $^{18}$O water target container for the proton irradiation, radioactive metal ions (isotopes of Co, Mn and the like) that are produced through a nuclear reaction by proton irradiation and recoiled into the solution can be eliminated during the $^{18}$F-electrodeposition and recovery process (see FIG. 8). All the metal ions such as $^{48}$V produced in case a Ti foil is used for the target container, metal ions contained in the $^{18}$O water as impurities, and nonradioactive metal ions eluting from other containers, liquid-delivery pump, tubes and the like, can be eliminated. The radioactive metal ion must be eliminated because it is not only harmful to the human body, but it also lowers, together with the stable metal ion, the efficiency with which $^{18}$F-labeled compounds are synthesized.

In contrast to the conventional ion exchange resin methods, the method of the present invention does not employ an ion exchange resin. Thus, the method of the present invention does not require a pre-treatment of the ion exchange resin and a flow-rate control of $^{18}$F solution for ion exchange, and does not suffer from the clogging of the ion exchange resin column. The column is disposed of as a radioactive waste after a single use, but an electrodeposition method only requires a replacement of the carbon electrode. Moreover, there is no need to use chemicals for recovery. Thus, the method of the present invention can prevent the mixing of impurities and also allows labeled compounds to be easily synthesized.

BEST MODE OF CARRYING OUT THE INVENTION

Figure 1:
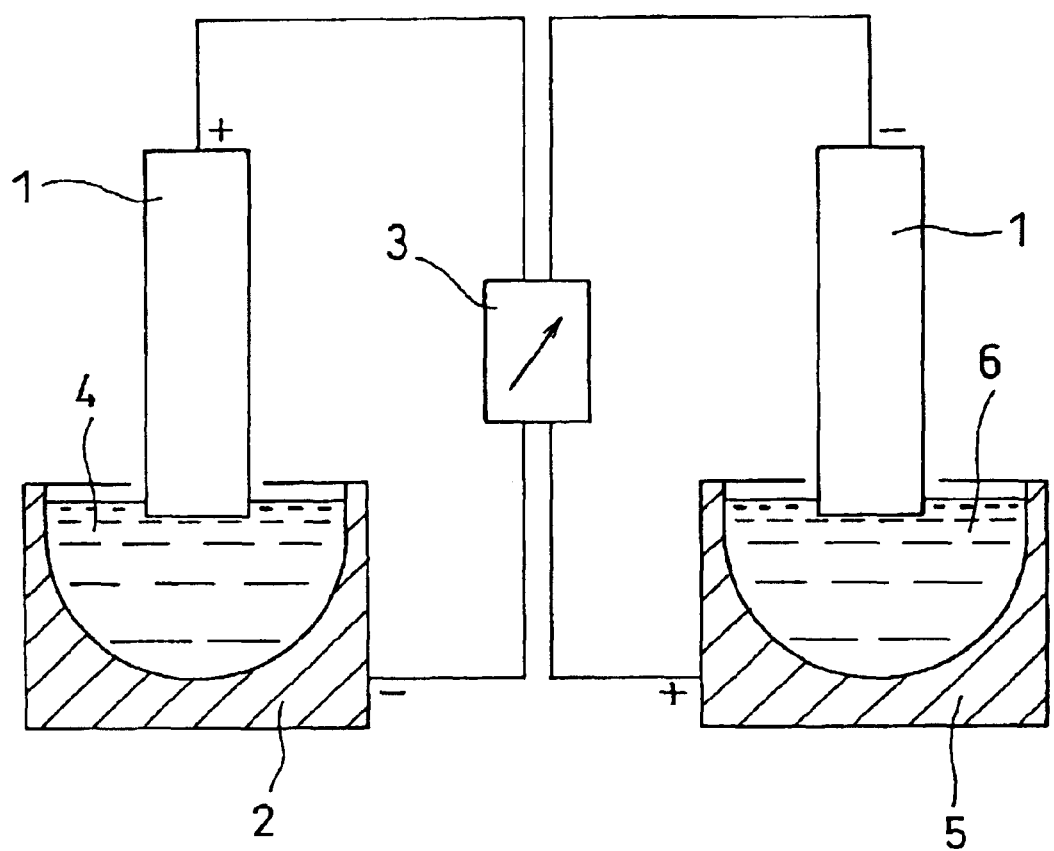
FIG. 1 shows a schematic illustration of a solid electrode and an electrodeposition bath.

Previous electrodeposition and recovery experiments involved an $^{18}$F solution of intensities ranging from 0.5 mCi/mL to 5 mCi/mL. We performed electrodeposition and recovery experiments as described below involving an $^{18}$F solution reaching a maximum 100 Ci/mL, and found that a high-intensity electrodeposition is superior to the ion exchange resin method. Hereafter, embodiments of the present invention will be described by referring to the drawings.

FIG. 1 schematically shows the main portion of an example of an electrodeposition apparatus used for the $^{18}$F separation and recovery method according to the present invention. As shown, the electrodeposition apparatus according to the present invention comprises a solid electrode 1 made of carbon or platinum, a first container (electrodeposition bath) 2' having wall surfaces of a material which is chemically inert to F (fluorine), such as platinum, and a power supply 3. When $^{18}$F is electrodeposited, $^{18}$O water 4 containing $^{18}$F is poured into the first container 2. Electric current is passed using the solid electrode 1 as an anode and the first container 2 as a cathode, whereby $^{18}$F in the $^{18}$O water 4 is electrodeposited on the surface of the solid electrode 1. Next, the solid electrode 1 having its surface electrodeposited with $^{18}$F is inserted into pure water 6 in a second container 5, and electric current is passed using this time the solid electrode 1 as a cathode and the second container 5 as an anode. As a result, the $^{18}$F bonded to the solid electrode 1 is recovered in the pure water in the second container 5. The first container 2 and the second container 5 may employ the same container, or they may employ separate containers.

Figure 2:
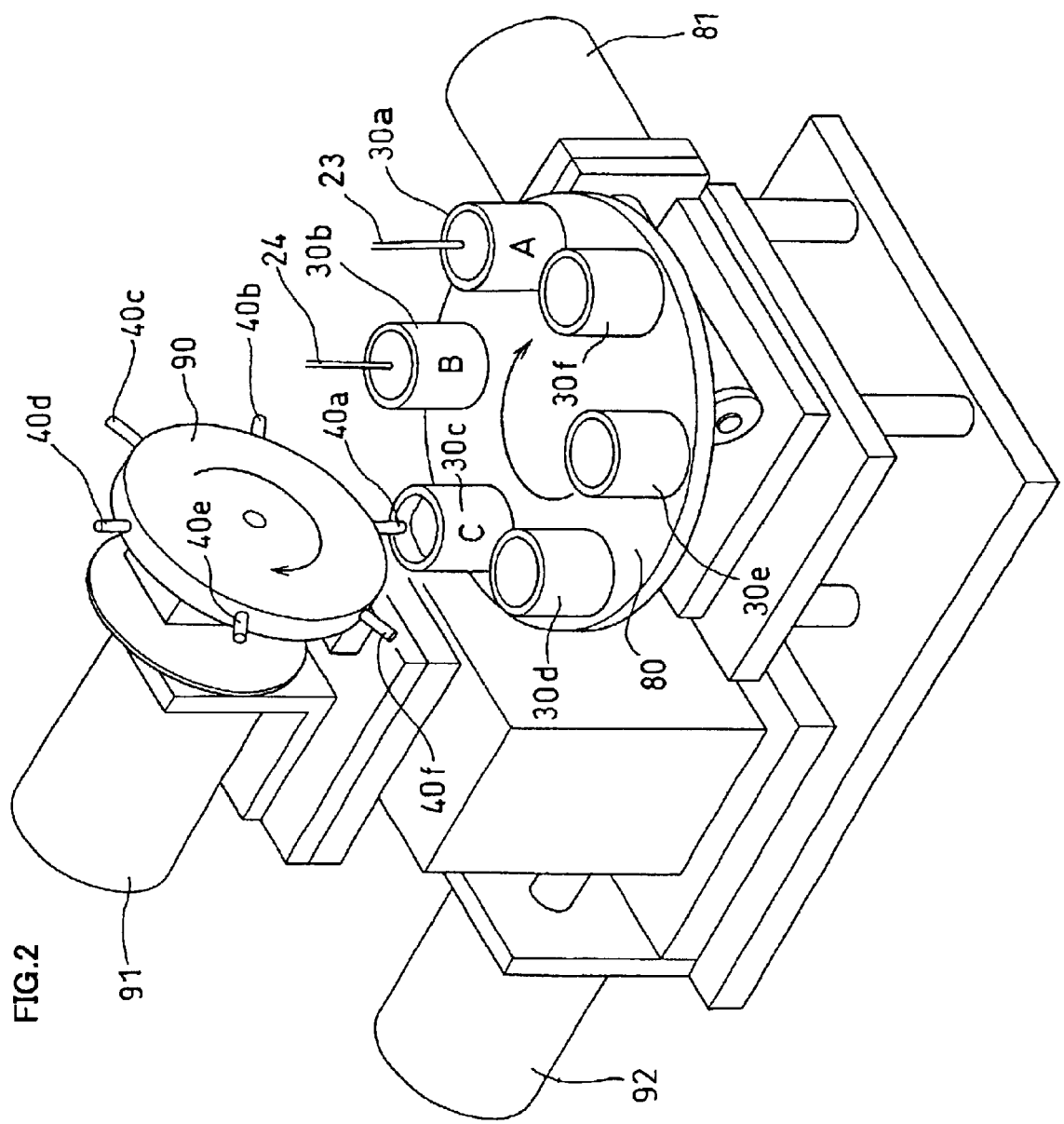
FIG. 2 schematically illustrates the overall structure of an electrodeposition apparatus used in the present invention.
Figure 3:
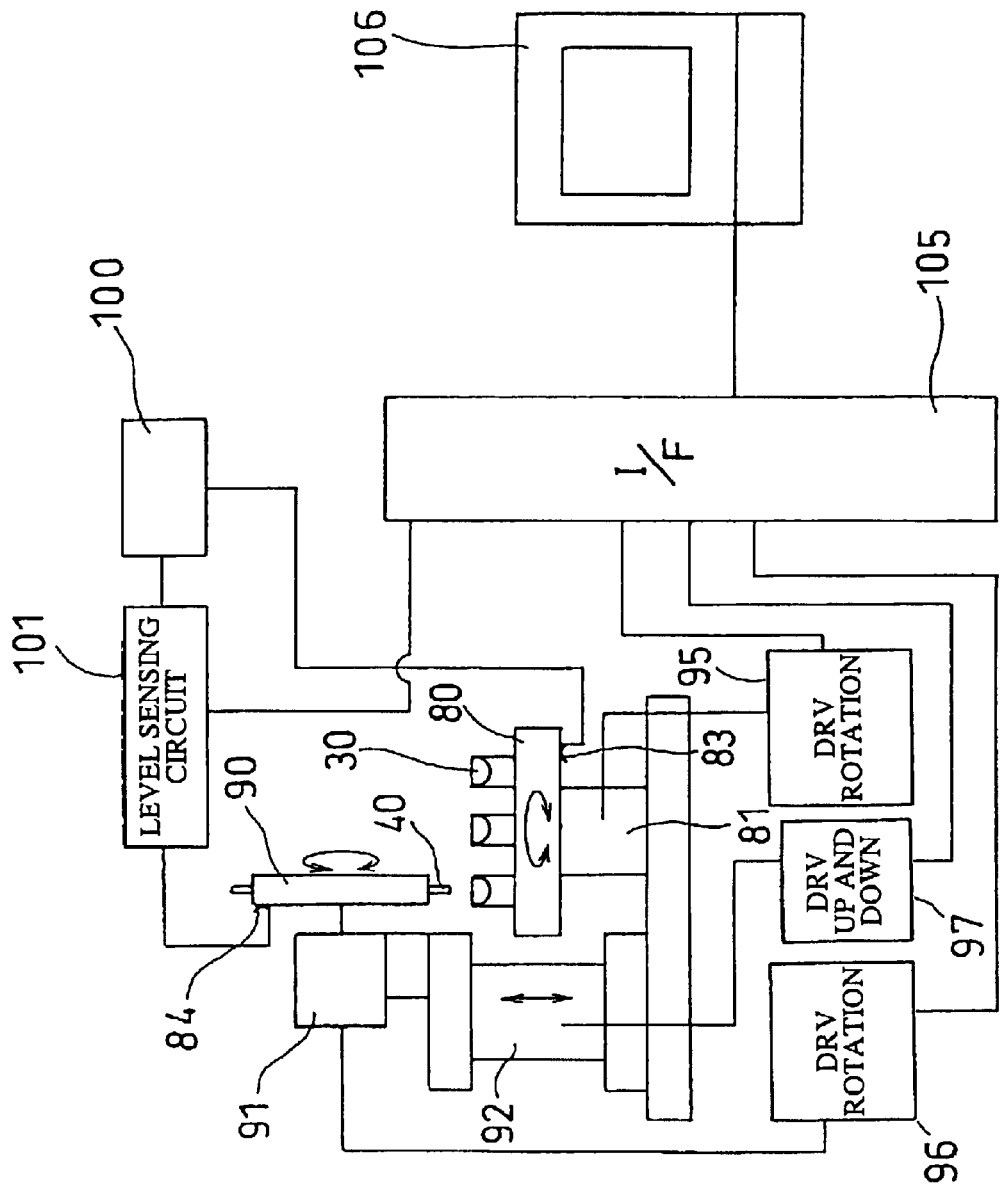
FIG. 3 shows a drive circuit chart of the apparatus.

FIG. 2 shows the overall structure of an example of the electrodeposition apparatus used in the present invention. FIG. 3 shows a drive circuit diagram of the apparatus. The apparatus comprises a rotating base 80 on which a plurality of containers 30a to 30f are mounted, and a rotating body 90 to which a plurality of solid electrodes 40a to 40f are detachably secured. Cylindrical graphite electrodes and platinum electrodes measuring 3, 5 and 10 mm in diameter, and 10 mm in length were employed as the solid electrodes 40a to 40f. The containers 30a to 30f employed platinum containers measuring 19 mm in diameter and formed with a hemispherical concave portion measuring 15 mm in depth. The rotating base 80 can be rotated 360° by a pulse motor 81, while the rotating body 90 can be rotated 360° by a pulse motor 91. The rotating body 90 can also be driven by a pulse motor 92 to move up and down. There need not necessarily be a plurality of solid electrodes, and the rotating body 90 is not necessarily required. All that is required, basically, is a mechanism by which a single solid electrode can be brought into and out of the solutions in two containers. In the present example, though, a plurality of solid electrodes 40a to 40f are attached to the rotating body 90 in order to eliminate the trouble of replacing the solid electrode.

The pulse motors 81, 91 and 92 are driven by motor drivers 95, 96 and 97 which are controlled by a computer 106 via an interface 105. A power supply 100 can have the polarities of its output terminals reversed, one output being connected to the rotating base 80 via phosphor bronze brushes 83 and 84, the other to the rotating body 90. Between the power supply 100 and the rotating body 90 electrically insulated from the rotating base 80 is connected a level sensing circuit 101 whose output is fed to the computer 106 via the interface 105. Inside the apparatus, a solution supply/discharge positions A, B, and an energizing position C are set. The solution supply/discharge position A is where $^{18}O$ water containing $^{18}F$ is injected into the container and where the $^{18}O$ water from which $^{18}F$ has been removed by electrodeposition is discharged. The other solution supply/discharge position B is where pure water is injected into the container and where the pure water containing desorbed $^{18}F$ is taken out.

A liquid target $^{18}O$ water is irradiated with protons accelerated by a cyclotron, and the $^{18}O$ water containing $^{18}F$ produced through the nuclear reaction $^{18}O(p, n)^{18}F$ is injected into the first container 30a via a Teflon tube 23. Meanwhile, pure water is injected into the adjacent second container 30b via a Teflon tube 24. After the injection of the $^{18}O$ water containing $^{18}F$ into the first container 30a and the pure water into the second container 30b, the pulse motor 81 is driven to rotate the rotating base 80, whereby the first container 30a is transported to the energization position C below the solid electrode 40a secured to the rotating body 90.

Next, the pulse motor 92 is driven to slowly lower the rotating body 90. The solid electrode 40a secured to the rotating body 90 descends gradually towards the solution stored in the first container 30a. The moment the solid electrode 40a with a positive electric potential contacts the liquid surface of the solution with a negative electric potential in the first container 30a, an electric current of a few mA is passed. The liquid surface level sensing circuit 101 detects the minute electric current by a digital multimeter, and transmits a surface level sensing signal to the computer 106 via a microminiature relay. Upon reception of the surface level sensing signal, the computer 106 controls the driver 97 such that the solid electrode 40a is further lowered by about 0.1 mm from that position. Thereafter, a voltage of 200 volts is applied by the power supply 100, whereby $^{18}F$ binds to the surface of an end portion of the solid electrode 40a as the anode.

Figure 4:
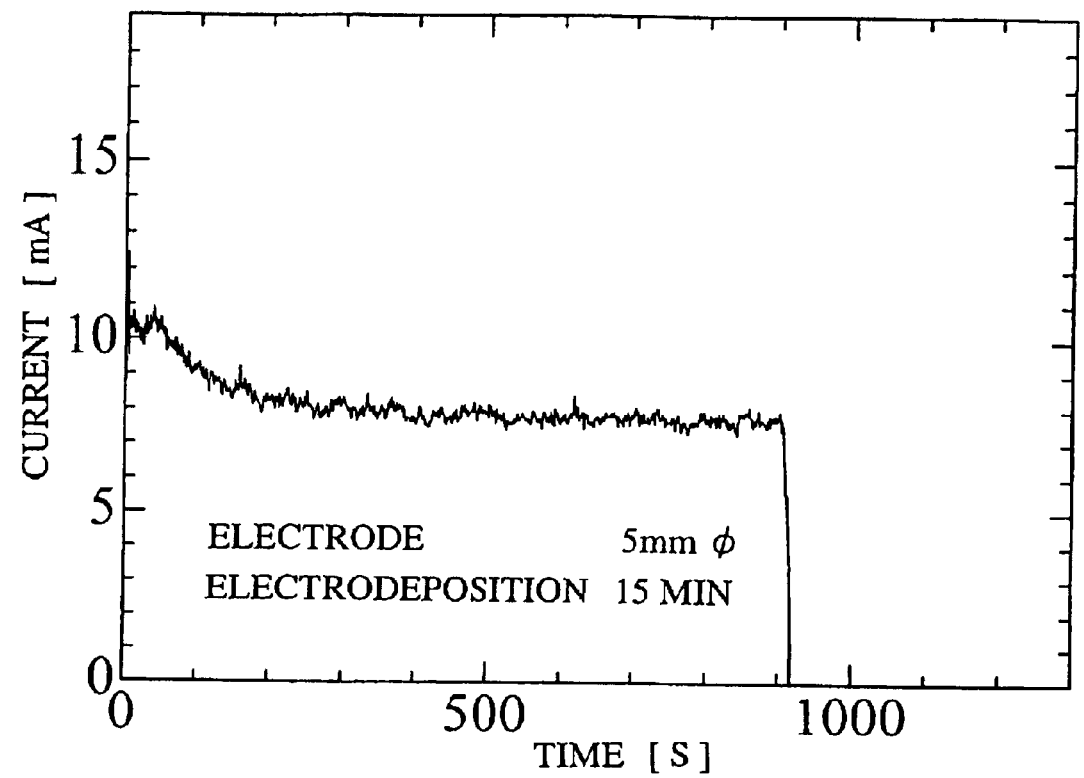
FIG. 4 shows charts plotting changes in electrodeposition current and voltage with electrodeposition time.
Figure 4:
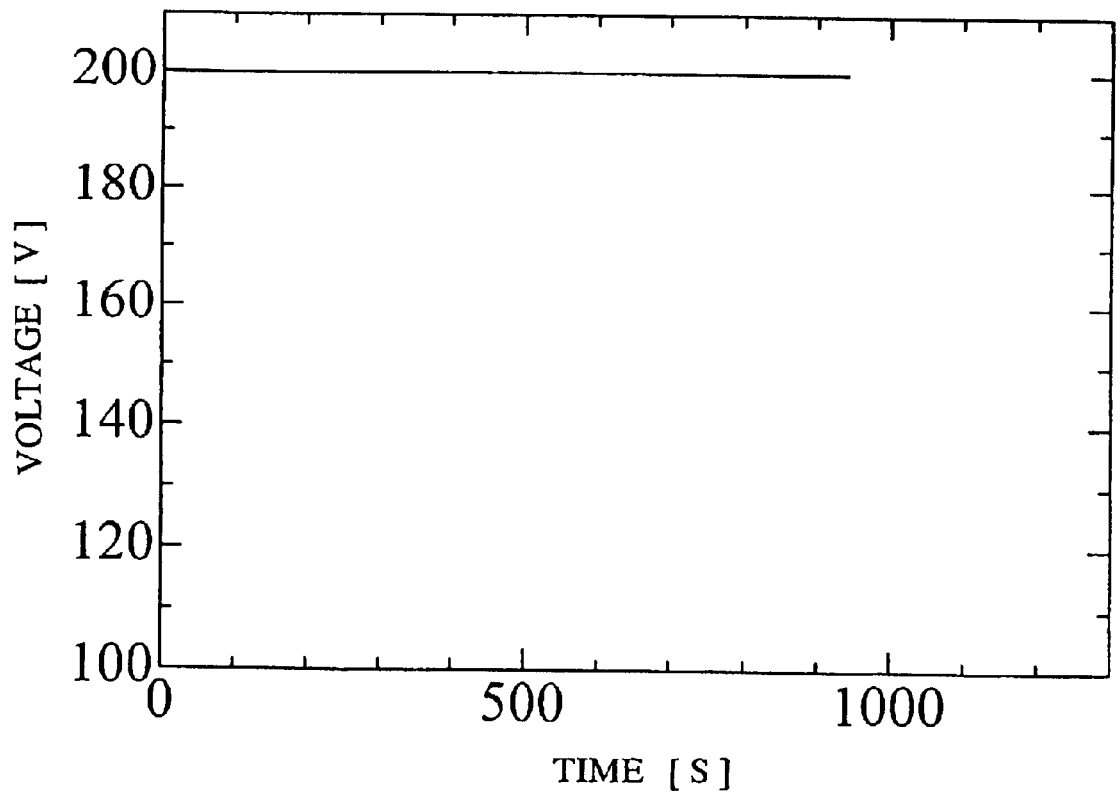

FIG. 4 shows charts illustrating the changes in electrodeposition current in the case where $^{18}F$ was electrodeposited on a graphite 5 mm in diameter by applying a constant voltage of 200 V. Immediately after the start of electrodeposition, the concentration of $^{18}F$ ions in the solution is so high that the electrodeposition current exhibits a large value. However, as the $^{18}F$ is electrodeposited on the graphite surface, the resistance of the solution becomes higher while the electrodeposition current becomes smaller. After the $^{18}F$ in the solution is electrodeposited, the ion concentration in the solution ceases to vary, so that the current also becomes constant. Thus, by measuring the changes in electrodeposition current during the recovery of $^{18}F$ and setting the time when the current value becomes constant as the electrodeposition termination time, time loss can be eliminated. From FIG. 4, it may be concluded that electrodeposition can be terminated in about 10 min.

As the electrodeposition of $^{18}F$ on the end portion of the solid electrode thus comes to an end, the pulse motor 92 is driven to raise the rotating body 90, thereby raising the solid electrode 40a above the first container 30a. Next, the pulse motor 81 is driven to rotate the rotating base 80, such that the second container 30b with pure water is positioned at the energizing position C. Then, the pulse motor 92 is driven to slowly lower the rotating body 90, while changing the polarities of the power supply 100 such that the solid electrode 40a becomes a cathode and the second container 30b becomes an anode. As the solid electrode 40a secured to the rotating body 90 slowly descends towards the solution (pure water) stored in the second container 30b, and the moment the solid electrode 40a with a negative electric potential contacts the liquid surface of the solution with positive electric potential in the second container 30b, several mA of electric current flows. The surface level sensing circuit 101 detects the minute current by a digital multimeter, and transmits a level-sensing signal to the computer 106 via a microminiature relay. Upon receipt of the surface level sensing signal, the computer 106 controls the driver 97 such that the solid electrode 40a is further lowered by about 0.1 mm from that position. Thereafter, 200 V is applied by the power supply 100, whereby the $^{18}F$ bound to the surface of the end portion of the solid electrode 40a as a cathode is desorbed to the pure water.

Figure 5:
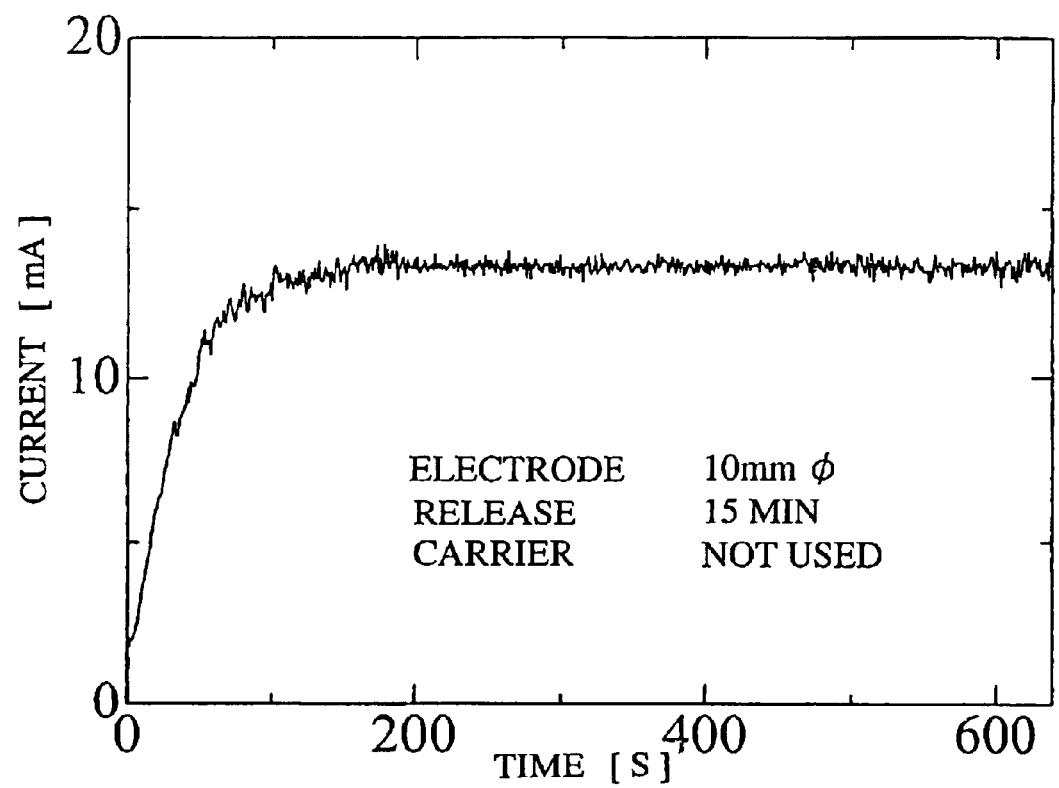
FIG. 5 shows charts plotting changes in release current and voltage with release time.
Figure 5:
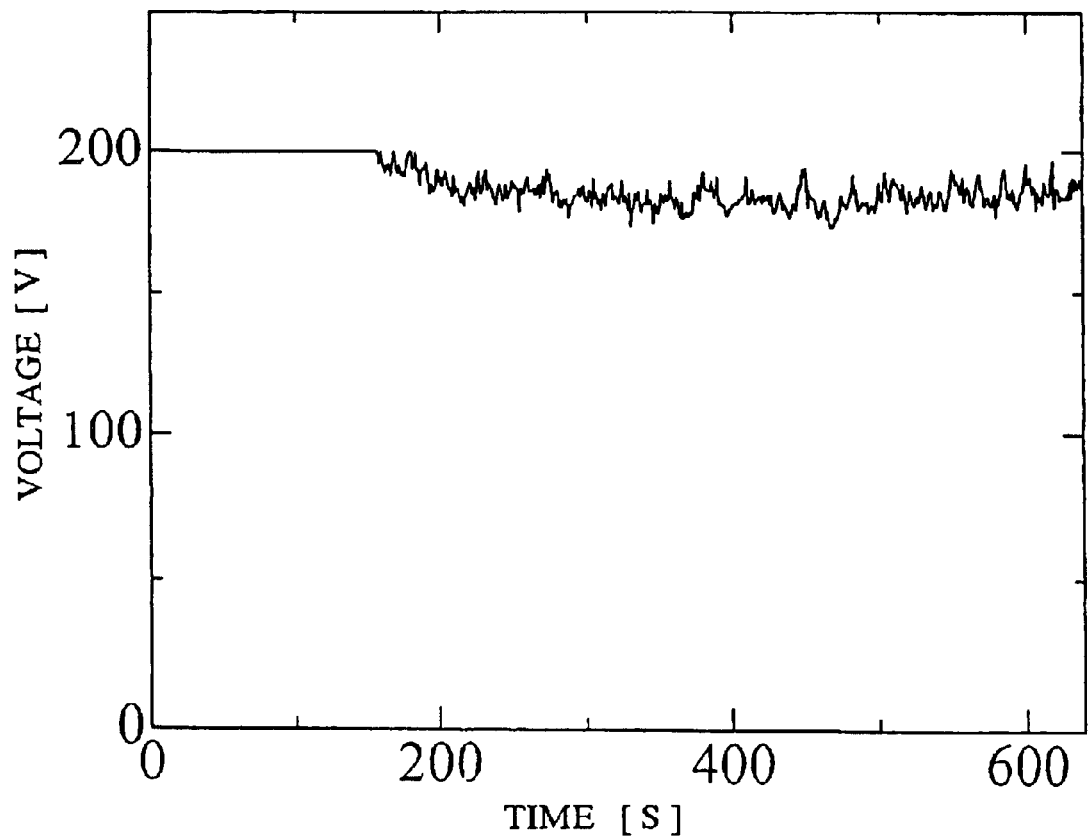

FIG. 5 shows charts illustrating the changes in current and voltage values in the case where the $^{18}F$ electrodeposited on the graphite electrode is desorbed into the pure water when the voltage and current were controlled to be constant at 200 V and 15 A, respectively. With the passage of desorption time, the ion concentration in the solution increases and the electric resistance of the solution becomes smaller, so that the value of the electric current with a constant voltage increases. After the $^{18}F$ electrodeposited on the electrode is desorbed into the water, the electric current stops increasing. It may be concluded from the change in the voltage that the desorption of the $^{18}F$ was completed in about three minutes. Accordingly, by setting the time at which the changes in current ceased to exist or the voltage started decreasing as an $^{18}F$ desorption completion time when the desorption process is terminated, time loss can be eliminated. This series of operations is automatically performed under the control of the computer 106.

According to the electrodeposition method by Alexoff et al, $^{18}F$ is electrodeposited on an anode electrodeposition bath. Since voltage is not applied when electrodeposition is completed, metal ions made diffused back into the solution and some of them attach to the electrodeposition vessel. In contrast, according to the present invention, voltage is applied until the anode on which $^{18}$F is electrodeposited is brought outside the $^{18}$O water, so that less metal ions attach. Further, during recovery, too, the method by Alexoff et al allows the metal ions to diffuse into the recovery $^{18}$F solution while the voltage is zero. In contrast, according to the present invention, since voltage is applied until the cathode is brought out of the recovered $^{18}$F solution, metal ions, even if they adsorb during electrodeposition, are not released from the electrode. Moreover, in the electrodeposition method by Alexoff et al, first the $^{18}$O water must be removed from the electrodeposition vessel and then the vessel must be filled with pure water before operations can be performed to desorb and recover $^{18}$F. In the method according to the present embodiment, a recovery vessel is placed near the $^{18}$F electrodeposition vessel, and preparations are made by putting pure water prior to the end of electrodeposition, so that the desorption operation can be performed right at the end of electrodeposition. As a result, it is possible to separate and recover $^{18}$F very quickly.

When the $^{18}$F is desorbed into pure water, the $^{18}$F electrodeposited on the surface of the solid electrode that is not in contact with the pure water are left on the solid electrode surface. If that happens, the releasing efficiency decreases. Thus, the electric current that flows when the solid electrode contacts the pure water is detected and the solid electrode is further lowered a prefixed distance, and then electrodeposition and desorption are performed. In the present example, the releasing was performed after lowering the end surface of the solid electrode down to 0.2 mm below the liquid surface. A method is conceivable whereby a portion considerably larger than the electrodeposited area is immersed into pure water. Such a method, however, has problems related to the evaporation of water by electrolysis of water or Joule heat, or to an increase in loss of $^{18}$F contained in the water that attaches due to the increase in the area of the solid electrode that is wet. Accordingly, in the present example, a method is adopted whereby the electrodeposited surface can be reliably brought into contact with pure water.

The $^{18}$O water that remains in the first container 30$a$ as the initial electrodeposition bath is recovered to be reused for irradiation. The recovery of the pure water solution containing the desorbed $^{18}$F and that of the $^{18}$O water were conducted by means of a syringe pump. Specifically, the solution and the water were recovered by attaching a Teflon tube to the tip of a motor-driven syringe pump and inserting the tip of the Teflon tube into the liquid while moving it up and down by a separate motor. A liquid delivery pump may be used in place of the syringe pump. Alternatively, a recovery opening may be provided at the bottom of the electrodeposition bath, so that the recovery can be performed by the opening and closing of a valve. In this case, the opening may be employed for the supply of pure water by using a branching tube and a valve in combination. The supply of pure water may be carried out by a syringe or a liquid-delivery motor.

Graphite is often used as a plating electrode, and high-purity graphite is manufactured to produce a high-quality plated surface. The method according to the present invention also employs high-purity graphite, so that mixture of impurities that would block the synthesis and utilization of labeled compounds can be easily prevented. Further, high-purity $^{18}$O water can be recovered. The concentration of $^{18}$F can be easily adjusted by varying the amount of pure water provided for desorption from the electrode occurs.

Hereafter, an experiment involving the apparatus shown in FIGS. 1 and 2 will be described in detail. By using a solid electrode 1 as an anode and a platinum first container (electrodeposition bath) 2 as a cathode, $^{18}$F in an H$_2$$^{18}$O solvent 4 was electrodeposited on the surface of the solid electrode 1. To compare the effects of materials, graphite and glassy carbon were used as the solid electrode. Three kinds of graphite electrodes measuring 10 mm in length and 3, 5 and 10 mm in diameter were also used to compare the results in order to examine the effect of each electrode size.

The ratio of the $^{18}$F electrodeposited on the graphite electrode to the $^{18}$F in the solution is referred to as an electrodeposition rate. The electrodeposition rate was determined by measuring annihilation γ-rays of positrons emitted by the β-decay of $^{18}$F. The electrodeposition rate shows the ratio of the number of measurements on the solid electrode to the sum of the numbers of measurements on the solid electrode and in the liquid after electrodeposition.

Figure 6:
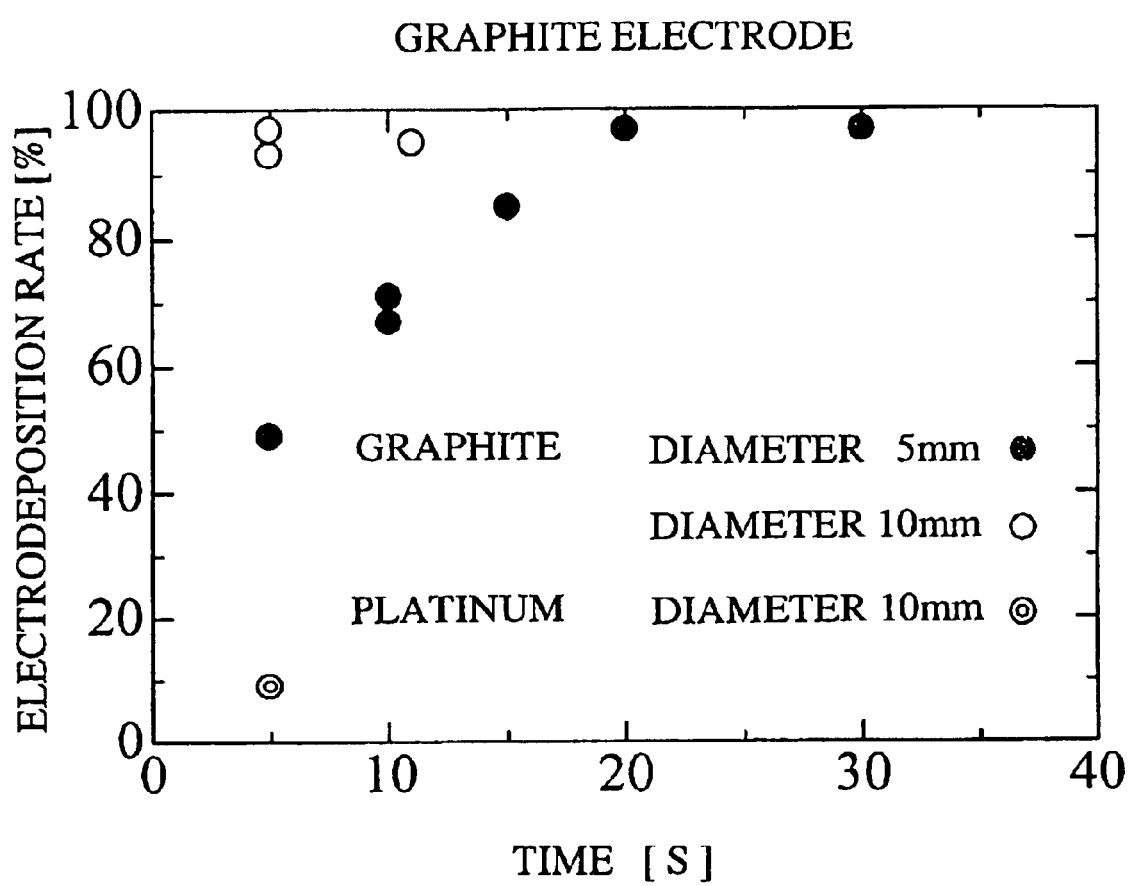
FIG. 6 shows a chart plotting the relationship among the electrodeposition time, electrode size, and electrodeposition rate.

As shown in FIG. 6, the electrodeposition rate increases as the electrodeposition time becomes longer. In the case of the graphite electrode with a diameter of 5 mm, the electrodeposition rate was around 50% for an electrodeposition time of 5 min, while the figure was 97% for an electrodeposition time of 20 min. In the case of a graphite electrode with a diameter of 10 mm, electrodeposition was almost completed in 5 min, showing the effect of the electrode size. As the size of the electrode increases, the value of electrodeposition current also becomes larger. It is believed, therefore, that the magnitude of the electrodeposition current is indicative of the amount of electrodeposition of $^{18}$F per unit time.

Figure 7:
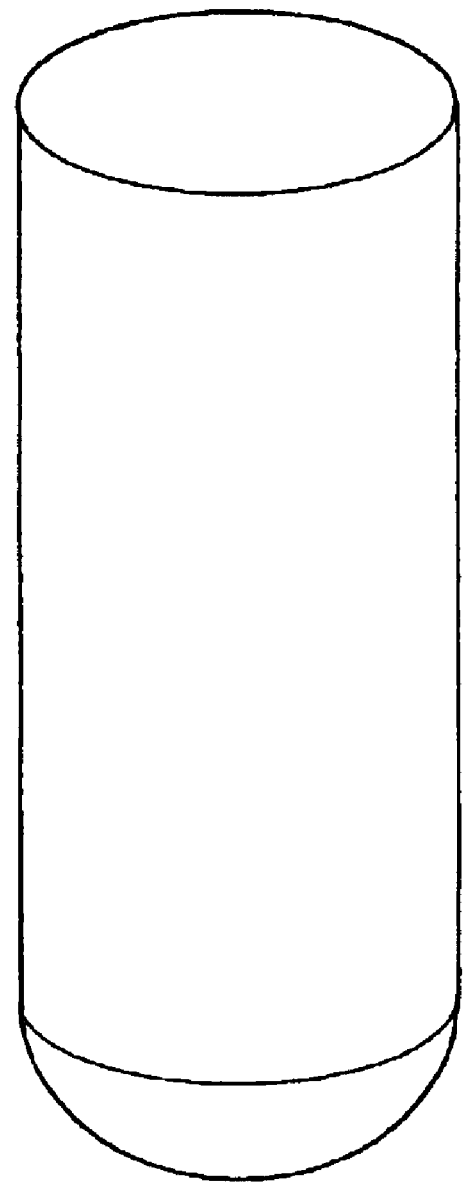
FIG. 7 schematically shows a solid electrode with a hemispherical electrodeposition surface.

Thus, the larger the electrodeposition surface is, the greater the electrodeposition rate becomes and the shorter it takes to perform electrodeposition. A larger electrodeposition surface also means that the amount of heat generated per unit area can be decreased while electrodeposition and desorption are carried out at constant voltage and current, so that electrodeposition can be completed in a shorter period of time, and thus the total amount of heat generated can be decreased. In order to enlarge the electrodeposition surface, it is also effective to form the electrodeposition surface of the solid electrode hemispherical, as shown in FIG. 7. Graphite is excellent as the material for the solid electrode, but any material may be used as long as the current is properly controlled. For example, porous platinum with an enlarged surface area may be used as the solid electrode.

The activity of $^{18}$F manufactured for PET is on the order of from several hundred mCi to Ci greater and is greater than that in the present experiment. Thus, the value of the current can be expected to become sufficiently large. When the changes in electrodeposition current were measured in the case of an electrode with a diameter of 5 mm, the current decreased and reached a constant value in about 9 min, as shown in FIG. 4. It is assumed that it will take about 10 min to electrodeposit $^{18}$F of 43 mCi/ml on an electrode of a diameter of 5 mm. The amount of $^{18}$F that can be electrodeposited on a graphite electrode is estimated to be at least 60 Ci in the case of a 5-mm diameter electrode, since the number of atoms of $^{19}$F contained in the carrier is 1000 times that of $^{18}$F of 60 mCi.

In the case of electrodeposition from a solution of 33 mCi/ml, when a glassy carbon electrode was used, small pieces of carbon peeled off into the solution. No such phenomena was observed in the case of a graphite electrode. The specific resistance of glassy carbon is about ten times that of graphite, and its thermal conductivity is about one tenth that of graphite. It is expected that even if the same values of voltage and current are present, glassy carbon generates more heat than graphite and thus becomes hotter. Furthermore, glassy carbon has a more homogeneous structure than graphite, and it has no such large holes that absorb changes due to thermal expansion that graphite has. As a result, it is believed that, in glassy carbon, part of the electrode has peeled off into small pieces.

A recovery experiment by the desorption of $^{18}$F was conducted by using the graphite electrodes of diameters 5 mm and 10 mm on which $^{18}$F had been electrodeposited as an anode, and by using a platinum container containing pure water or a 2-ppm Na$^{19}$F solution as a cathode. In the case of the electrode with a diameter of 5 mm, 68% of the $^{18}$F electrodeposited was desorbed into the pure water. In the case of the electrode with a 10-mm diameter, 89% was desorbed into pure water. The current was greater in the 10-mm diameter electrode. When the $^{18}$F electrodeposited on the 5-mm diameter electrode was desorbed into the 2-ppm Na$^{19}$F solution, the recovery rate was 87.6%. The measurement time was 10 min. The desorption current increased with time and levelled off in about 2 min. Thus, it is estimated that it takes about two min for the desorption of $^{18}$F. The desorption rate (recovery rate) was determined by measuring the γ-rays emitted from the $^{18}$F-electrodeposited electrode immediately before the desorption and the γ-rays emitted from the pure water containing the $^{18}$F after the desorption, and calculating the ratio of the counts.

The current through a liquid not containing $^{18}$F value was measured by applying a 200 V voltage. In the case of pure water, the current was 1 mA, and in the case of 2 ppm NaF added to pure water, the value was 8 mA. When a voltage of 200 V was applied to an $^{18}$F solution of about 40 mCi/ml, a current of about 10 mA was observed to flow, and an electrodeposition rate of 89% was obtained in 15 min. When a voltage of 200 V was applied and the desorption into pure water was carried out after electrodepositing 2-ppm NaF, 5 mA of current flew. On the other hand, when $^{18}$F was electrodeposited on the solid electrode from an $^{18}$F solution of 43 mCi/ml and desorbed into pure water, at least 13 mA of current flew in the case of the 10-mm diameter electrode, as will be seen from FIG. 5. Thus, in the case of an $^{18}$F solution of concentration on the order of 40 mCi/ml, an amount of current sufficient for the electrodeposition and desorption flows without the NaF carrier, so that there is no need to use an NaF carrier.

The time required from the desorption to the recovery is thought to be about 10 min. When recovering a high-intensity $^{18}$F for PET by the electrodeposition method, a sufficient amount of current can be passed, so that an even higher electrodeposition rate and desorption rate can be obtained in a short period of time.

Figure 8:
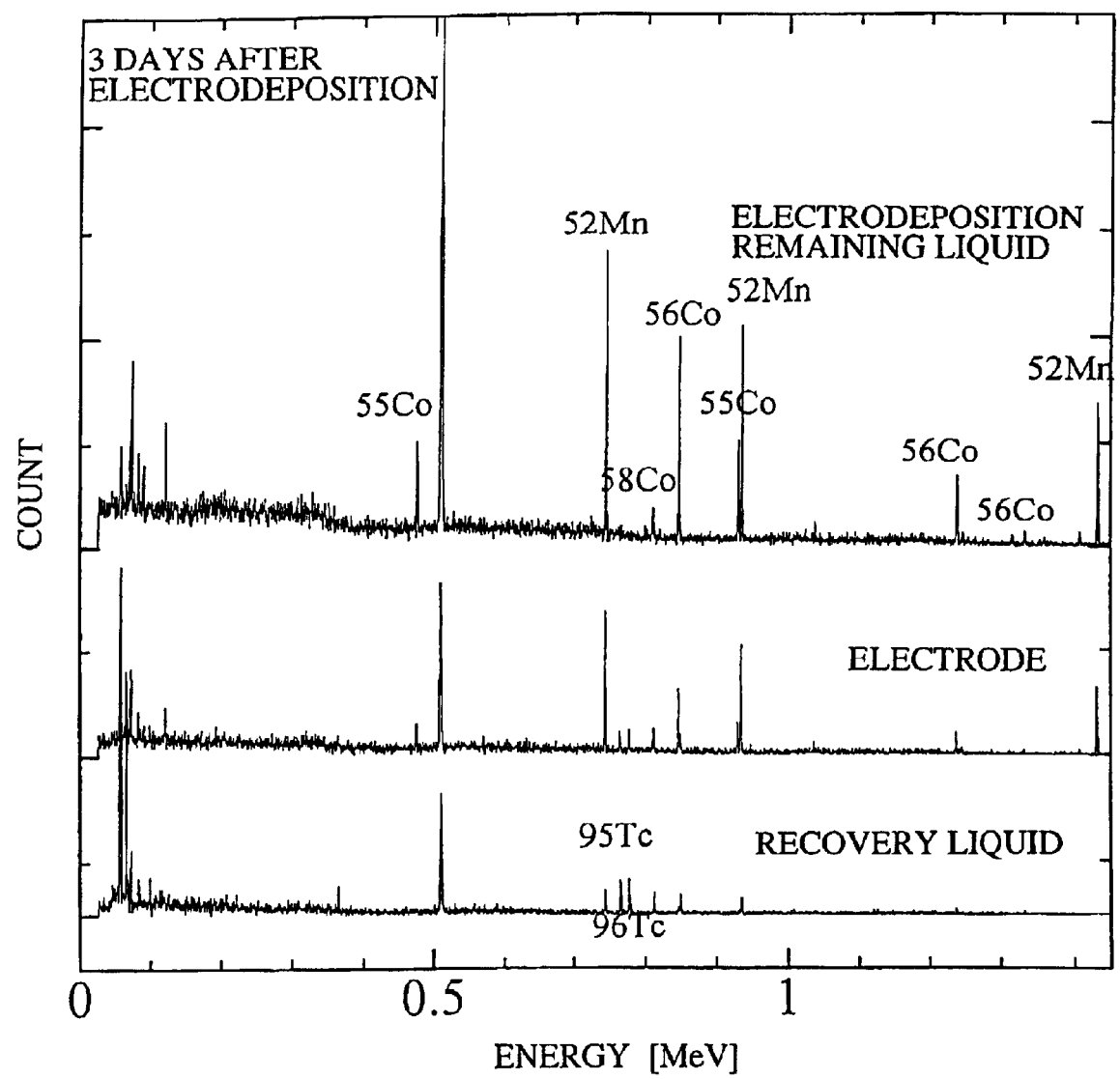
FIG. 8 shows RI energy spectra measured of impurity metals.

Three days after electrodepositing $^{18}$F on the graphite electrode and releasing into pure water by the application of an inverse voltage, the energy spectrum of the γ-rays emitted from the electrodeposition remaining liquid ($^{18}$O recovery liquid), electrode and recovery liquid was measured by a Ge detector. The results are shown in FIG. 8.

RI of Co and Mn was identified from the γ-ray energy. When the counts of the γ-rays from the electrodeposition remaining liquid, the graphite electrode, and the $^{18}$F recovery liquid were compared, the count for the graphite electrode was a fraction of that for the electrodeposition remaining liquid, and almost no count was recognized in the $^{18}$F recovery liquid. This result shows that because these impurity metal ions are present in the aqueous solution as cations, their concentration becomes high near the platinum vessel and so the adsorption on the graphite electrode decreases, and that those that were adsorbed are not released into the $^{18}$F recovery liquid when $^{18}$F is released because of the use of the graphite electrode as the cathode. The result shows that the method according to the present invention is effective in removing metal RI which causes radiation exposure in the body and in removing those and other metal ions which block the synthesis of $^{18}$F labeled compounds.

An $^{18}$F electrodeposition experiment was conducted by using platinum as an electrode instead of graphite. The platinum electrode had a diameter of 10 mm and the same shape as that of the graphite electrode. FIG. 6 shows the results obtained. The electrodeposition rate after five min of electrodeposition was 9%. The recovery rate for the platinum electrode was 85%, which was comparable to that of the graphite electrode. In this experiment, though the electrodeposition rate for the platinum electrode is an order of magnitude smaller than that of the graphite electrode, the platinum electrode has a great potential for practical application and superiority for the following reasons.

Graphite is a substance with large pores, so that it has a far larger surface area than a platinum electrode with the same diameter and shape. The effect the surface area of an electrode has on the electrodeposition rate is obvious from the result of the graphite experiment. Thus, it is expected that by using a platinum electrode with a large surface area, an electrodeposition rate comparable to that of the graphite electrode can be obtained. Examples of a platinum electrode with a large surface area include porous platinum, sintered platinum powder, mesh, and "as mesh" (a product provided with minute pressed perforations). Another advantage of using a platinum electrode for the separation of $^{18}$F and recovery of $^{18}$O water is that the electrode can be used in a repeated manner quite easily. Platinum is superior to graphite in strength. It can be easily sterilized or disinfected, so it does not necessitate the replacement of the electrode.

In the $^{18}$F-separation and recovery method according to the present invention, it is preferable to continue to apply a voltage until the graphite or platinum electrode is completely separated from the liquid in both of the steps for electrodeposition and release into pure water of $^{18}$F.

In accordance with the method of the present invention, while the metal ions in the $^{18}$F solution are concentrated near the cathode during the application of the electrodeposition voltage, they are not precipitated on the electrode surface because they have greater ionization tendency than hydrogen. When the anode is in contact with the liquid surface, the metal ion concentration near the anode is small as long as the electrodeposition voltage is applied, resulting in few metal ions being adsorbed on the anode. In the method by Alexoff et al, since the container is an anode, there is always a moment when the electrodeposition voltage becomes zero, metal ions again diffuse into the liquid, and even after the $^{18}$O water has been drained and recovered from the container, some of the metal ions are adsorbed on the container surface. The adsorption surface area of a carbon material is known to be large.

Regarding the metal ions during the releasing stage, since the metal ions are not released from the cathode in the method according to the present invention, the metal ion concentration in the $^{18}$F recovery liquid is small (FIG. 8). According to the method by Alexoff et al, some of the metal ions adsorbed on the cathode container are eluted into the $^{18}$F solution when the release voltage becomes zero. Thus, the efficiency with which to remove the metal ions can be increased by the method in accordance with the present invention.

The fact that there is a moment when the voltage becomes zero in each of the states where $^{18}F$ is electrodeposited on the anode container and where $^{18}F$ is released into pure water affects the efficiency with which $^{18}F$ is recovered and separated. There is an equilibrium state in the ratio between the $^{18}F$ electrodeposited on the solid electrode and the $^{18}F$ in the solution. Upon application of a voltage, this equilibrium progresses towards electrodeposition and releasing. It is assumed that, as the voltage becomes zero, the equilibrium that has progressed towards electrodeposition or releasing goes in the opposite direction, thereby decreasing the efficiency of both electrodeposition and releasing.

Figure 9:
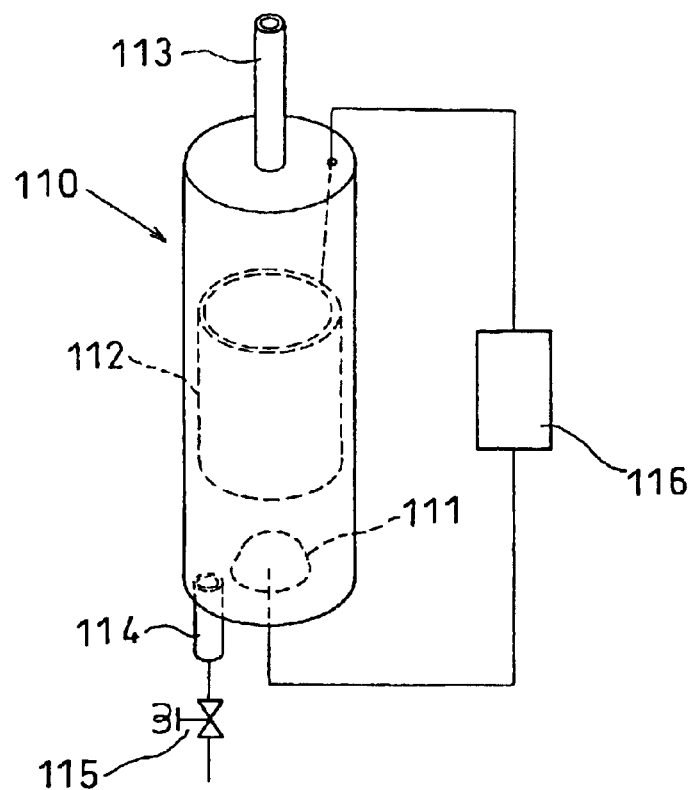
FIG. 9 schematically shows the main portion of another example of the electrodeposition apparatus used in the $^{18}$F-separation and recovery method according to the present invention.

Another embodiment of the present invention will be hereafter described. FIG. 9 schematically shows the main part of another example of the electrodeposition apparatus used in the method of separating and recovering $^{18}F$ according to the present invention.

The electrodeposition apparatus shown in FIG. 9 comprises a container 110 made of a material chemically inert to F (fluorine), such as platinum. The container 110 houses a solid electrode 111 made of carbon or platinum, and a cylindrical electrode 112 made of a material such as, e.g., platinum, iridium, palladium, rhodium, or gold. The container 110 and the electrodes 111, 112 are electrically insulated from each other. The electrodes 111 and 112 are connected to a power supply 116. A solution-introducing tube 113 is connected to the upper part of the container 110, and a solution-discharging tube 114 is connected to the lower part of the container 110. The solution-discharging tube 114 has a valve 115 that can be opened and closed remotely by either electrical control or air operation. The electrode 112 does not necessarily have to be cylindrical. Nor is it essential that the solid electrode 111 is hemispherically shaped as shown in the drawing.

Hereafter, the method of separating and recovering $^{18}F$ from $^{18}O$ water by means of the electrodeposition apparatus shown in FIG. 9 will be described. Initially, when $^{18}F$ in the $^{18}O$ water is electrodeposited, the valve 115 is closed, and the $^{18}O$ water containing $^{18}F$ is introduced into the container 110 via the solution-introducing tube 113. Next, the polarities of the power supply 116 are set such that the solid electrode 111 becomes an anode and the electrode 112 becomes a cathode and the electrodes are energized, whereby the $^{18}F$ in the $^{18}O$ water is electrodeposited on the surface of the solid electrode 111. After the electrodeposition is completed, the valve 115 is opened, and a pressurized gas is introduced via the solution-introducing tube 113 to discharge the $^{18}O$ water in the container 110 through the tube 114. Thereafter, the valve 115 is closed and pure water is injected into the container 110 via the solution-introducing tube 113. Then, the polarities of the power supply 116 are set such that this time the solid electrode 111 becomes a cathode and the electrode 112 becomes an anode. The electrodes are thereafter energized, whereby the $^{18}F$ electrodeposited on the surface of the solid electrode 111 is released into the pure water. Finally, the valve 115 is opened, a pressurized gas is introduced via the solution-introducing tube 113 to thereby recover the pure water containing the $^{18}F$ in the container 110 via the tube 114.

Figure 10:
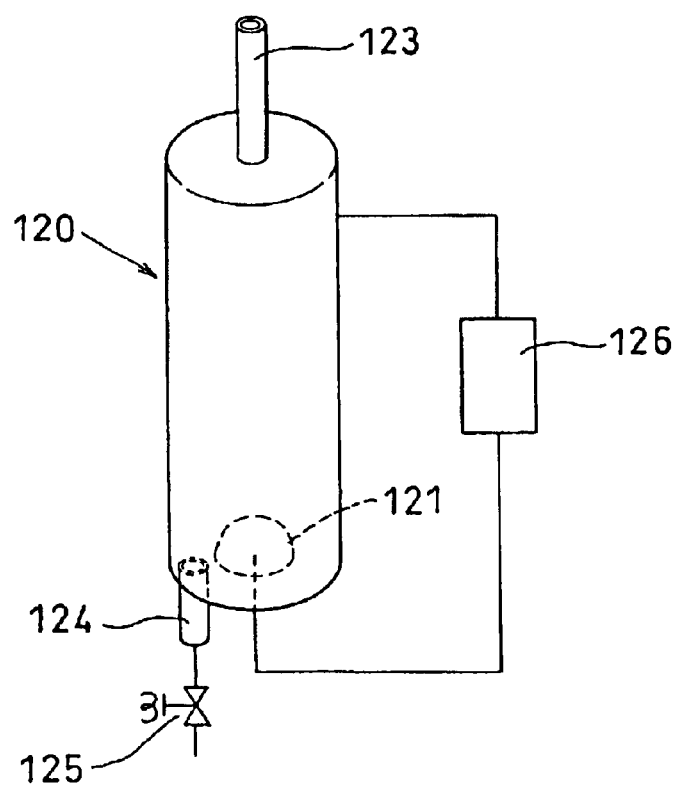
FIG. 10 schematically shows the main portion of yet another example of the electrodeposition apparatus used in the $^{18}$F-separation and recovery method according to the present invention.

FIG. 10 schematically shows the main portion of another example of the electrodeposition apparatus used in the method of separating and recovering $^{18}F$ according to the present invention. The electrodeposition apparatus shown in FIG. 10 employs the container itself as an electrode, so the electrode inside the container shown in FIG. 9 can be done away with.

Specifically, the electrodeposition apparatus shown in FIG. 10 comprises a container 120 made of a material chemically inert to F (fluorine), such as platinum. The container 120 houses a solid electrode 121 made of carbon or platinum. The container 120 and the electrode 111 are electrically insulated from each other. The electrode 121 and the container 120 are connected to a power supply 126. A solution-introducing tube 123 is connected to the upper part of the container 120, while a solution-discharging tube 124 is connected to the lower part of the container 120. The solution-discharging tube 124 has a valve 125 that can be opened and closed remotely by electric control or air operation. The solid electrode 121 does not necessarily have to be hemispherical as shown. The method of separating and recovering $^{18}F$ in the $^{18}O$ water by means of the electrodeposition apparatus shown in FIG. 10 is similar to the case of using the electrodeposition apparatus shown in FIG. 9 and is therefore not described.

In accordance with the conventional method of separating and recovering $^{18}F$ by means of the ion exchange resin, an ion exchange resin is put into a column, the $^{18}O$ water containing $^{18}F$ is passed through a tube connected to the column, and the $^{18}F$ is adsorbed on the ion exchange resin, whereby the $^{18}F$ is separated from the $^{18}O$ water. After this separation operation, a solution of potassium carbonate is put through the column in order to exchange the carbonate ions and the $^{18}F$ ions and recover the $^{18}F$. By replacing the ion exchange resin column in the $^{18}F$-separation and recovery system using the conventional ion exchange resin with the solution-flow type electrodeposition apparatus having the structure shown in FIG. 9 or 10, the separation and recovery method according to the present invention using electrodeposition can be easily realized on the separation and recovery system using the conventional ion exchange resin as is.

POTENTIAL FOR INDUSTRIAL APPLICATION

In accordance with the present invention, since only the $^{18}F$ is removed by electrodeposition from the $^{18}O$ water by using a solid electrode as an anode, there is no problem of the $^{18}O$ water being diluted or adulterated with impurities, so that the $^{18}O$ water can be recycled Further, since the $^{18}F$ is desorbed into pure water in a second container and recovered by using a solid electrode as a cathode, the $^{18}F$ can be recovered in a short period of time without impurities being mixed therein.

What is claimed is:

1. A method of separating and recovering $^{18}F$ comprising the steps of:

applying a voltage by using a solid electrode as an anode and either an electrode disposed in a container holding $^{18}O$ water containing $^{18}F$ or the container itself as a cathode, so that the $^{18}F$ binds to the surface of the solid electrode;

applying a voltage by using as a cathode the solid electrode to which the $^{18}F$ is electrodeposited and as an anode either an electrode disposed in a container holding pure water or the pure-water holding container itself, such that the $^{18}F$ bound to the surface of the solid electrode is released into the pure water.

2. A method of separating and recovering $^{18}F$ according to claim 1, wherein the solid electrode is made of either carbon or platinum.

3. A method of separating and recovering $^{18}F$ according to claim 1, wherein either graphite, platinum or other material resistant to fluorine with an increased surface area is used as the solid electrode.

4. A method of separating and recovering $^{18}F$ according to claim 1, wherein the step in which the $^{18}F$ binds to the surface of the solid electrode comprises monitoring the degree of electrodeposit of the $^{18}$F to the solid electrode surface on the basis of an electric current flowing between the solid electrode and the cathode.

5. A method of separating and recovering $^{18}$F according to claim 1, wherein the step in which the $^{18}$F deposited to the surface of the solid electrode is released into pure water comprises monitoring the degree of release of the $^{18}$F on the basis of one selected from an electric current and a voltage across the solid electrode and the anode.

6. A method of separating and recovering $^{18}$F according to claim 2, wherein the step in which the $^{18}$F binds to the surface of the solid electrode comprises monitoring the degree of electrodeposit of the $^{8}$F to the solid electrode surface on the basis of an electric current flowing between the solid electrode and the cathode.

7. A method of separating and recovering $^{18}$F according to claim 3, wherein the step in which the $^{18}$F binds to the surface of the solid electrode comprises monitoring the degree of electrodeposit of the $^{18}$F to the solid electrode surface on the basis of an electric current flowing between the solid electrode and the cathode.

8. A method of separating and recovering $^{18}$F according to claim 2, wherein the step in which the $^{18}$F deposited to the surface of the solid electrode is released into pure water comprises monitoring the degree of release of the $^{18}$F on the basis of one selected from an electric current and a voltage across the solid electrode and the anode.

9. A method of separating and recovering $^{18}$F according to claim 3, wherein the step in which the $^{18}$F deposited to the surface of the solid electrode is released into pure water comprises monitoring the degree of release of the $^{18}$F on the basis of one selected from an electric current and a voltage across the solid electrode and the anode.

\* \* \* \* \*